Oct. 9, 1923.
C. N. COLSTAD
SHOCK ABSORBER
Filed Dec. 31, 1921
1,470,148
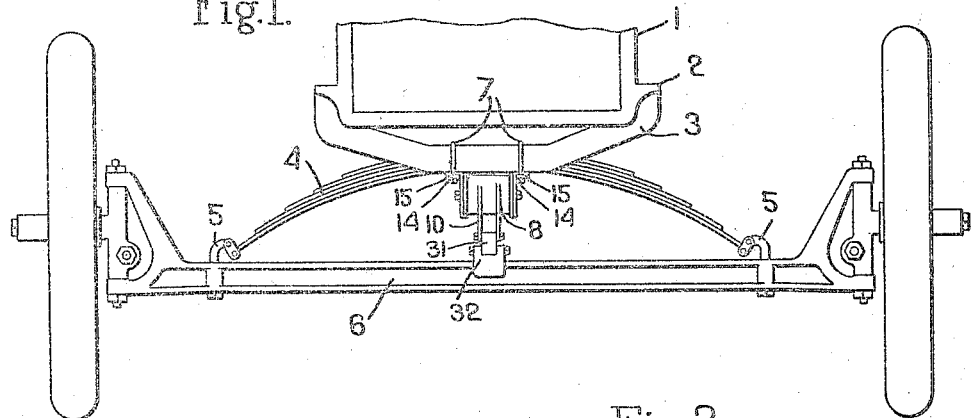
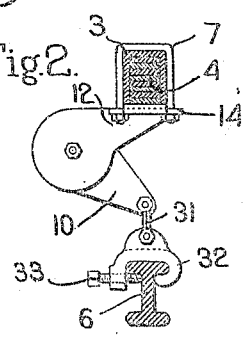
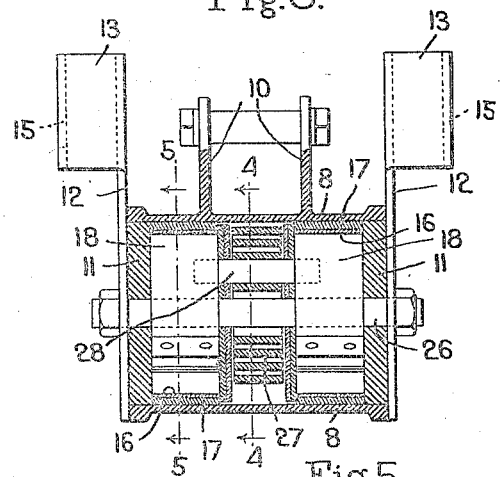
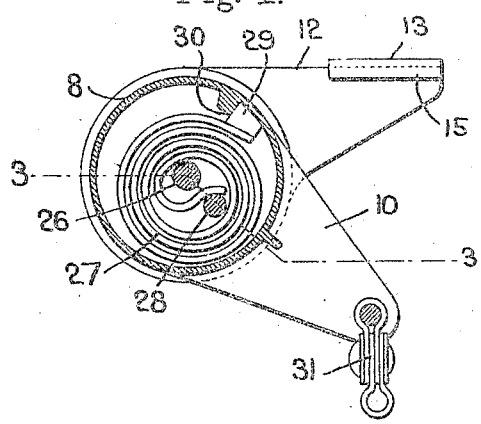
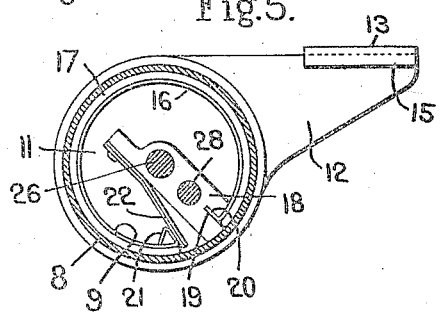
Inventor.
Charles N. Colstad
by Howard Smith & Tennant.
Attys Patented Oct. 9, 1923.

1,470,148

UNITED STATES PATENT OFFICE.

CHARLES N. COLSTAD, OF NORFOLK DOWNS, MASSACHUSETTS.

SHOCK ABSORBER.

Application filed December 31, 1921. Serial No. 526,108.

*To all whom it may concern:*

Be it known that I, CHARLES N. COLSTAD, a citizen of the United States, and resident of Norfolk Downs, county of Norfolk, State of Massachusetts, have invented an Improvement in Shock Absorbers, of which the following description, in connection with the accompanying drawing, is a specification, like characters on the drawing representing like parts.

This invention relates to shock absorbers such as are used on automobiles and other high speed road vehicles for the purpose of controlling the recoil of the vehicle spring after it has been compressed. The invention relates particularly to shock absorbers of the friction type in which the resistance offered to the recoil of the spring is due to frictional engagement of two friction members with each other.

One of the objects of the invention is to provide an improved shock absorber of this type in which the friction-producing members are constructed so that they develop a relatively light friction during the compressing movement of the vehicle spring, thus permitting said spring to act freely in absorbing the shock, but develop a heavy friction during the recoil movement of the spring which is sufficient to retard the recoil so as to cause the spring to assume its normal position with an easy movement. With this general object in view the invention consists in the various features which will be more fully hereinafter set forth and then pointed out in the appended claims.

In order to give an understanding of the invention I have illustrated an embodiment thereof adapted to be used in connection with an automobile having a spring extending transversely of the body, but I wish it understood that the invention may be embodied in shock absorbers adapted for use with any automobile or any road vehicle.

In the drawings, Fig. 1 is a front view of a portion of an automobile showing my improvements applied thereto.

Fig. 2 is an enlarged section on the line 2—2, Fig. 1.

Fig. 3 is a section on the line 3—3, Fig. 4.
Fig. 4 is a section on the line 4—4, Fig. 3.
Fig. 5 is a section on the line 5—5, Fig. 3.

In Fig. 1 of the drawings 1 indicates a portion of an automobile, the frame 2 of which is formed with a channel-shaped cross member 3 within which is received a spring 4, the latter being mounted on perches 5 secured to the axle 6. The spring 4 is secured to the cross piece 3 of the frame by means of spring clips 7.

The parts thus far described are or may be all as usual in Ford automobiles.

My shock absorber comprises two friction members, one of which is secured to the frame of the automobile and the other of which is secured to the axle, said friction members being constructed so that they have a relative movement as the spring 4 flexes and the automobile body 1 moves relatively to the axle. The construction further is such that when the spring 4 is compressed and the body 1 moves toward the axle, said friction members develop a relatively light friction thus offering very little resistance to the compressing movement of the spring. When the spring recoils, however, and the body 1 moves away from the axle 6 then the friction members develops a heavy friction which retards the recoil movement of the spring and causes it to resume its normal position in an easy manner and without being carried beyond such normal position by the recoil movement. One friction member is preferably in the form of a drum 8 and the other friction member in the form of a split friction band 9 engaging the inner face of the drum.

The drum 8 is shown as provided with one or more arms 10 that are connected to the axle 6, and the friction band 9 is carried by a supporting head 11 which is situated within the drum and is capable of turning therein, said head being rigidly secured to the vehicle frame 1. This can conveniently be accomplished by making said head with an arm 12 rigid therewith, which in turn is secured to the vehicle frame. The connection between the arm 12 and the vehicle frame may be provided for in a variety of ways without departing from my invention, the particular construction being dependent upon the constructional details of the vehicle to which the device is attached.

In the case of an automobile of the type herein shown the arm 12 is formed with a lateral flange 13 which underlies the cross piece 3 and which is clamped to the cross piece by means of the clamping plate 14 and the spring clip 7. This flange 13 is shown as having a lip 15 at its outer edge, the spring clip 7 and the clamping plate 14 being situated between the body of the arm and the lip.

In the construction shown the drum 8 is open at both ends and there is a supporting head 11 closing each end of the drum, each head having the arm 12 which is secured to the vehicle body as above described. The two heads are tied together by a tie bolt 26 and as they are both rigidly secured to the frame they constitute practically a unitary structure.

Each head supports a friction band 9 so that there are two friction bands operating within the drum.

These friction bands are so connected to the heads 11 that when the arms 10 and 12 move toward each other, as will be the case when the spring 4 is compressed, a relatively light friction is developed between the friction bands and the drum, while when the arms move away from each other, as will be the case when the spring 4 recoils, a heavy friction will be developed between the bands and the drum. Each friction band may be made of a backing 16 of spring metal and a lining 17 of friction material similar to that used in brake linings. One end of each friction band is rigidly secured to the head 11 and the other end is free. Each head 11 is shown as having a rib 18 which extends in a radial direction and is provided at its end with a slot 19 to receive the inturned end 20 of the metal band 16, this constituting a rigid but detachable connection between the bands and the head. The other end of the metal band 16 is bent to form a foot portion 21 which rests against a spring arm 22 secured to the rib 18, said arm tending normally to hold the free end of the split bands in engagement with the interior of the drum.

When the arms 10 and 12 move toward each other thereby giving the drum an anti-clockwise movement in Fig. 5, which operation will occur when the spring 4 is compressed, a light friction will be developed between the drum and each friction band because the frictional engagement of the free end of the bands with the drum will tend to move the free end of the band toward the rib 18 and against the action of the spring 6, thus contracting the friction band. On the other hand, when the spring 4 recoils and the arms 10 and 12 are moved away from each other the drum 8 will have a clockwise movement in Fig. 5 and the friction of the drum against the free end of the friction band will tend to spread the band thus causing it to have an increased frictional grip on the drum. This movement is augmented by the resilient action of the spring 22 and the result will be that when the arms 10 and 12 move away from each other a heavy friction will be developed, which furnishes a decided retarding action to the recoil of the spring and prevents said spring from recoiling beyond its neutral point.

Each of the friction bands 9 operate in the manner above described.

I have also incorporated in the device a spring element constructed so that it normally tends to move the arms 10 and 12 toward each other, one purpose of this spring being to maintain the parts under slight tension or perfectly taut so as to eliminate any lost motion. The spring herein shown is indicated at 27 and is in the form of a spiral spring which is fastened at its inner end to the connected heads 11 and at its outer end to the drum 8. The two ribs 18 are shown as having an anchoring pin 28 extending from one to the other, the ends of the pin being received in apertures in the two ribs. The spring 27 is situated between the ribs 18 and has one end bearing against the pin 28, said spring being in the form of a spiral and having at its outer end a lug or head 29 which engages a lug 30 extending inwardly from the drum 8. With this construction the separating movement of the arms 10 and 12 operates to wind up the spring, and said spring exerts a constant tendency to cause the arms to move toward each other, thus keeping the parts perfectly taut and free from back lash.

The arms 10 may be connected to the axle in any suitable way. One convenient way is to provide said arms with a link member 31 which is connected to a clamping block 32 that is adapted to be clamped to the axle 6 by a clamping screw 33. Any other way of connecting the parts may be employed, however, without departing from the invention.

The shock absorber is constructed so that it can be easily installed on the machine, the installation involving merely the unscrewing the nuts at the bottom of the spring clips 7 and removing the clamping plates 14 and then replacing said plates and nuts with the flanges 13 clamped between the plates 14 and the frame, and then connecting the clamping block 32 to the axle 6. All these operations can be easily performed by any person and do not require the attention of a skilled mechanic.

I claim:

1. In a shock absorber, the combination with a drum open at each end, of a head closing each end of the drum, means rigidly connecting said heads, means for securing the heads to the frame of an automobile, an arm extending from the drum and adapted to be secured to the axle of an automobile, whereby the yielding movement of the automobile body will cause the drum and heads to turn relative to each other, a split friction band for each head, each band having one end rigidly secured to the corresponding head and having frictional engagement with said drum, and a spring arm carried by each head and engaging the other end of the corresponding band.

2. In a shock absorber, the combination with a drum open at each end, of a head closing each end of the drum, means rigidly connecting said heads, means for securing the heads to the frame of an automobile, an arm extending from the drum and adapted to be secured to the axle of an automobile, whereby the yielding movement of the automobile body will cause the drum and heads to turn relative to each other, a split friction band for each head, each band having one end rigidly secured to the coresponding head and having frictional engagement with said drum, a spring arm carried by each head and engaging the other end of the corresponding band, and a coil spring situated between the bands and secured at one end to the heads and at the other end to the drum.

3. In a shock absorber, the combination with a drum open at each end, of a head closing each end of the drum, means rigidly connecting said heads, means for securing the heads to the frame of an automobile, an arm extending from the drum and adapted to be secured to the axle of an automobile, whereby the yielding movement of the automobile body will cause the drum and heads to turn relative to each other, a split friction band for each head, each band having one end rigidly secured to the corresponding head and having frictional engagement with said drum, a spring arm carried by each head and engaging the other end of the corresponding band, and a coil spring situated between the bands and secured at one end to the heads and having at the other end a lug engaging a lug projecting inwardly from the drum.

In testimony whereof, I have signed my name to this specification.

CHARLES N. COLSTAD.